United States Patent [19]
Strange et al.

[11] Patent Number: 5,281,060
[45] Date of Patent: Jan. 25, 1994

[54] ANNULAR HOLE CUTTER

[75] Inventors: Robert E. Strange, Marco Island, Fla.; William C. Mckay, Davenport, Iowa; Michael D. Fangmann, Blue Grass, Iowa; Timothy M. Flaherty, Davenport, Iowa

[73] Assignee: Jancy Engineering Company, Davenport, Iowa

[21] Appl. No.: 991,330

[22] Filed: Dec. 16, 1992

[51] Int. Cl.⁵ .............................................. B23B 51/04
[52] U.S. Cl. .................................... 408/204; 408/206
[58] Field of Search ................ 403/204, 206, 207, 703

[56] References Cited

U.S. PATENT DOCUMENTS

| Re. 33,440 | 11/1990 | Hougen | 408/206 |
|---|---|---|---|
| 3,244,035 | 4/1966 | Jehle et al. | 408/204 |
| 3,559,513 | 2/1971 | Hougen | 408/204 |
| 4,573,838 | 3/1986 | Omi et al. | 408/204 |
| 4,586,857 | 5/1986 | Ohmi | 408/206 |
| 4,632,610 | 12/1986 | Hougen | 408/204 |

FOREIGN PATENT DOCUMENTS

| 211408 | 12/1982 | Japan | 408/204 |
|---|---|---|---|
| 529910 | 1/1977 | U.S.S.R. | 408/204 |

Primary Examiner—Daniel W. Howell
Attorney, Agent, or Firm—Robert G. Mentag

[57] ABSTRACT

An annular hole cutter including a cylindrical body provided with a plurality of circumferentially spaced apart cutter teeth, including a first group of cutter teeth that have alternate radial inner cutting edges and a second group of cutter teeth that have alternate radial outer cutting edges that are staggered circumferentially rearwardly from the alternate radial inner cutting edges of the first group of cutter teeth. The cutting edges on the cutter teeth of both groups of cutter teeth each have a leading point, and the leading point of the cutting edges on one of said groups of cutter teeth extends downward longitudinally beyond the leading point of the cutting edges on the other of said groups of cutter teeth.

9 Claims, 5 Drawing Sheets

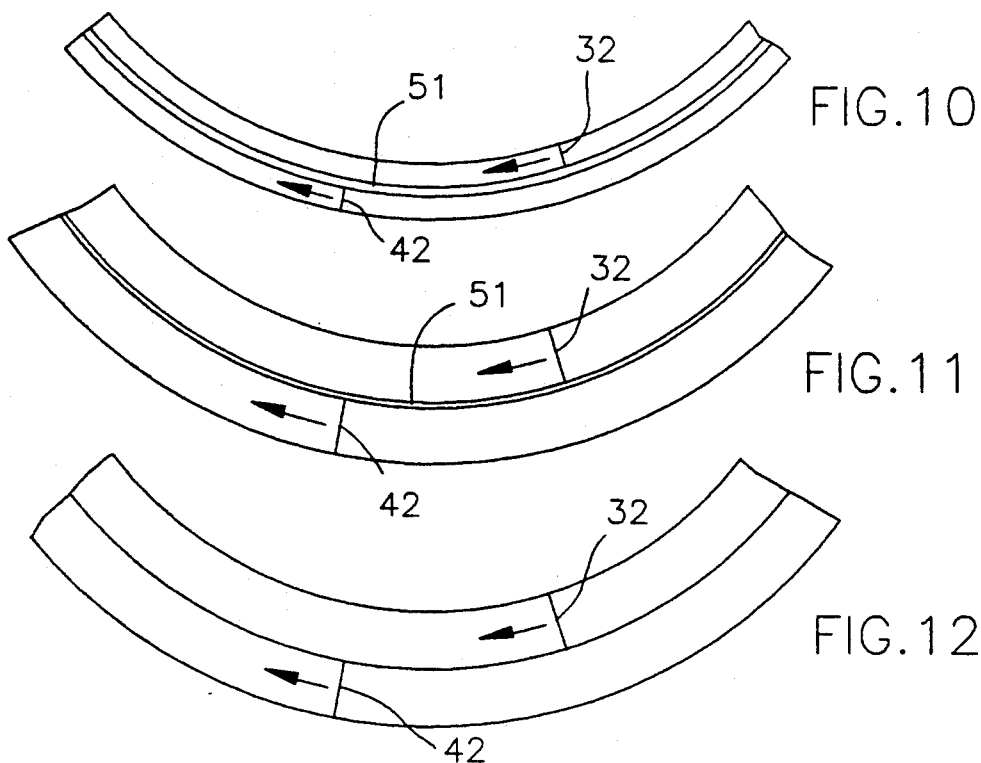
FIG.10
FIG.11
FIG.12
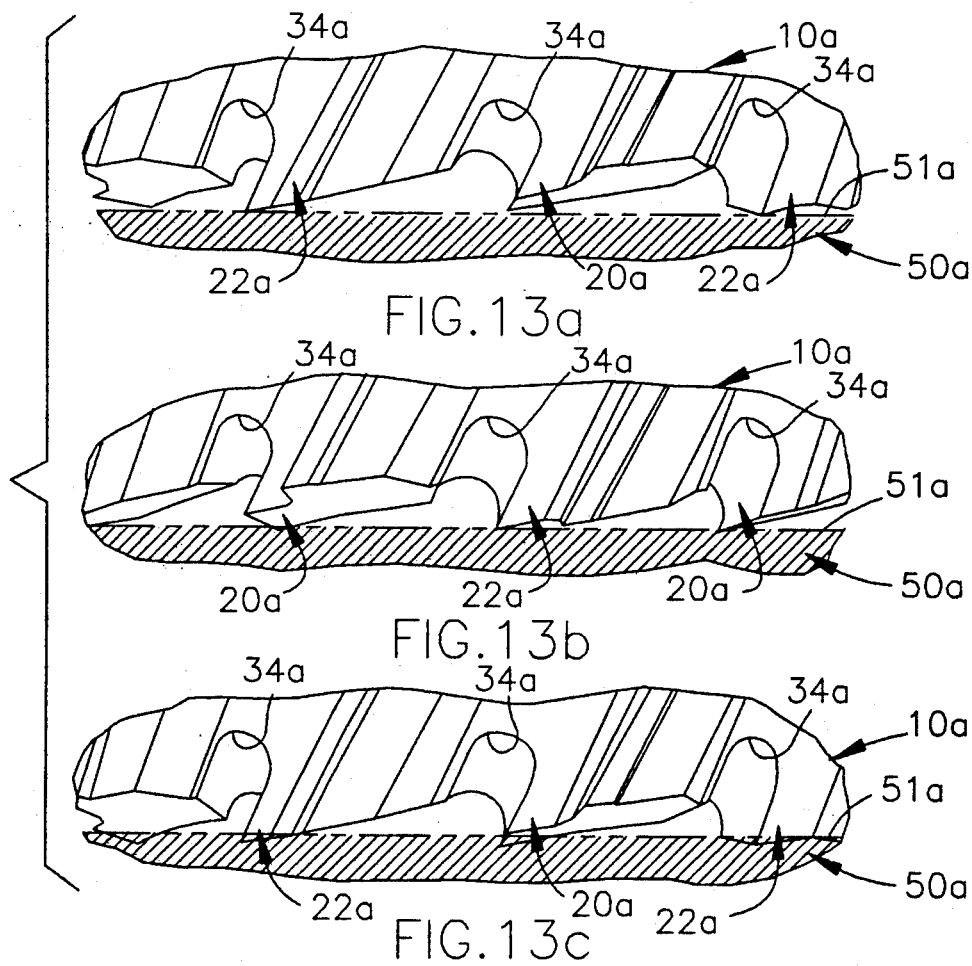
FIG.13a
FIG.13b
FIG.13c

ANNULAR HOLE CUTTER

BACKGROUND OF THE INVENTION

1. Field of the Invention

This invention relates to annular hole cutters. Class 408, Cutting by Use of Rotating Axially Moving Tool, Subclass 204, United States Patent Office Classification, appears to be the applicable general area of art to which the subject matter similar to this invention has been classified in the past.

2. Description of the Prior Art

Portable magnetic drill presses are used on construction projects for drilling holes in metal construction members, and they have a major limitation in the variance of their revolutions per minute. Experience has shown that when the motors of such magnetic drill presses are required to drive or rotate large diameter annular hole cutters that their revolutions per minute are too fast for such large diameter annular hole cutters to effectively and efficiently enter a workpiece. Under such conditions a large diameter annular cutter chatters or vibrates to a point where it is very difficult to start an initial cut in a workpiece. The chattering and vibration in some cases becomes so violent that a large diameter annular hole cutter becomes damaged. The annular hole cutter of the present invention, with its staggered cutting teeth, is configured for large diameter annular hole cutters which are capable of entering into a workpiece with no vibration.

SUMMARY OF THE INVENTION

According to the present invention there is provided an annular hole cutter which is constructed to overcome the chattering and vibration problems involved with large diameter annular hole cutters required to be rotated by portable drill presses. The present invention provides an annular hole cutter including a cutter body having a generally cylindrical sidewall, which is provided around the lower end thereof, with a plurality of circumferentially spaced apart cutter teeth.

The cutter teeth include a first group of teeth that have alternate radial inner cutting edges, and a second group of teeth that have alternate radial outer cutting edges. The alternate radial outer cutting edges on the second group of teeth are staggered circumferentially rearwardly, from the alternate radial inner cutting edges, in relation to the direction of rotation of the annular hole cutter. In one embodiment of the invention the first group of cutter teeth have the alternate radial inner cutting edges extended longitudinally downward, from the bottom of the cutter, a predetermined distance beyond the alternate radial outer cutting edges of the second group of cutter teeth, so that when the cutter is used, the alternate radial inner cutting edges lead the alternate radial outer cutting edges and will engage a workpiece and penetrate into the workpiece before the alternate radial outer cutting edges. The staggered cutter tooth arrangement of the cutter of the invention functions so that each group of cutter teeth carries its share of the cutting burden.

In a second embodiment of the invention the alternate radial outer cutting edges are extended longitudinally downward, from the bottom of the cutter, a predetermined distance beyond the alternate radial inner cutting edges and lead the alternate radial inner cutting edges into a cutting operation on a workpiece.

BRIEF DESCRIPTION OF THE DRAWINGS

FIGS. 10 thru 12 are schematic, fragmentary, plan views of the surface of a workpiece and they illustrate the width of the material removal area made by each group of the staggered cutter teeth of the annular hole cutter 10, after a 0.02 inches depth cut, a 0.04 inches depth cut, and a 0.06 inches depth cut, respectively.

FIGS. 13a thru 13h are fragmentary, elevation perspective views of the lower end of a modified annular hole cutter, and showing the progression of the penetration of the modified annular hole cutter into a workpiece.

DETAILED DESCRIPTION OF THE PREFERRED EMBODIMENTS

Figure 1:
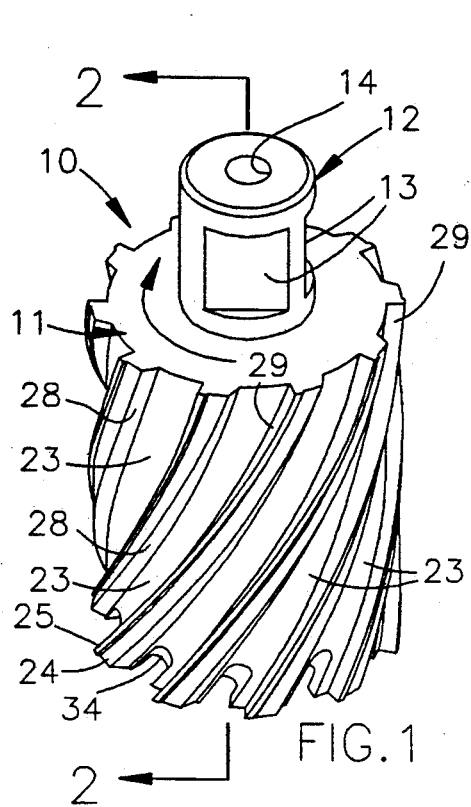
FIG. 1 is an elevation perspective view of an annular hole cutter, made in accordance with the present invention.
Figure 2:
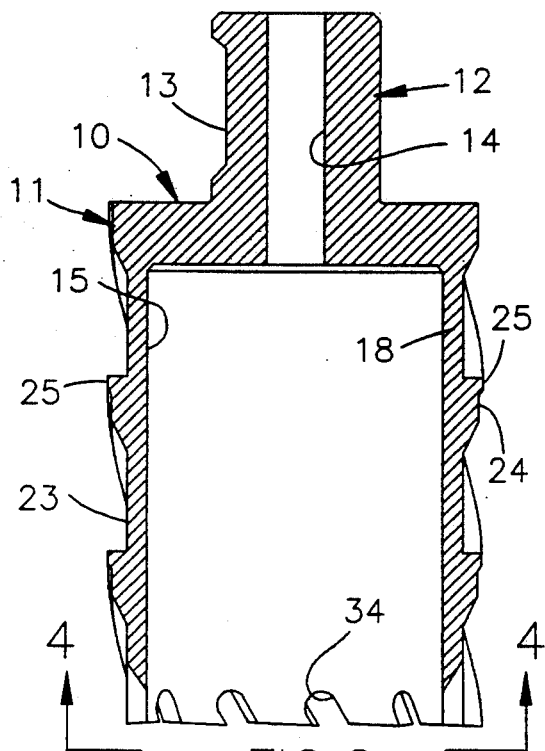
FIG. 2 is an elevation section view of the annular hole cutter illustrated in FIG. 1, taken along the line 2—2 thereof, and looking in the direction of the arrows.
Figure 3:
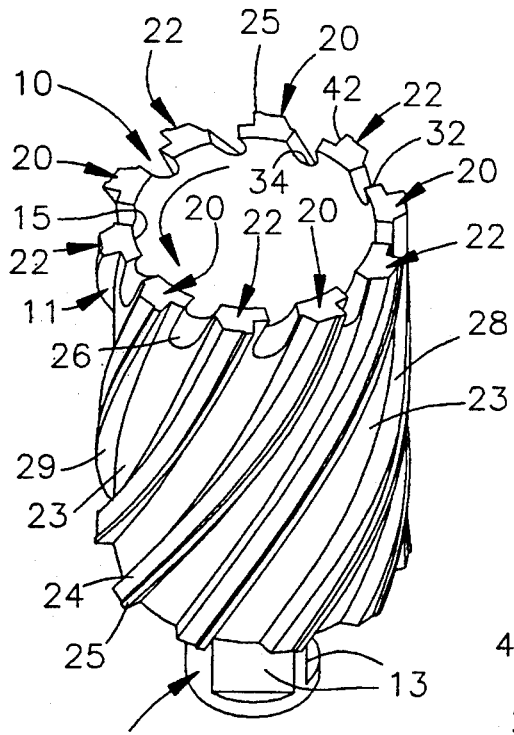
FIG. 3 is an elevation perspective view of the annular hole cutter illustrated in FIG. 2, and showing the bottom of the cutter with its staggered cutting teeth arrangement.

Referring to the drawings, and in particular to FIGS. 1-3, the numeral 10 generally designates an annular hole cutter made in accordance with the principles of the present invention, and which is designed for forming holes in metal workpieces. The annular hole cutter 10 includes a cutter body, generally indicated by the numeral 11, and an arbor or shank, generally indicated by the numeral 12. The shank 12 is provided with a standard size, outer diameter for interchangeability with a common drive mechanism. A pair of suitable chucking flats 13, are formed on the periphery of the shank 12 to provide a means for driving the annular hole cutter 10 without slippage.

Figure 4:
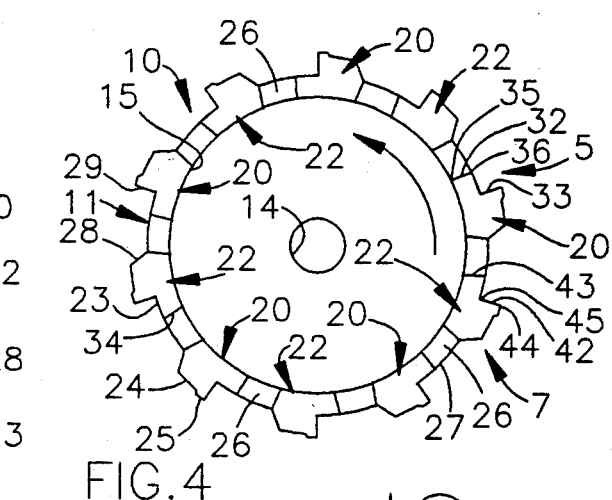
FIG. 4 is a bottom view of the annular hole cutter illustrated in FIG. 2, taken along the line 4—4 thereof, and looking in the direction of the arrows.

The annular hole cutter shank 12 is provided with an axial pilot bore 14. The axial pilot bore 14 communicates at its inner end with a larger diameter axial body bore 15 which is formed through the cutter body 11 from the lower end thereof. It will be understood, that the annular hole cutter 10 may be made to any desired length and diameter. In one embodiment the cutter was provided with a shank that was 0.685 inches long and a cutter body that was 2.500 inches long. The outer diameter of the shank was 0.685 inches. The outer diameter of the cutter body was 1.580 inches. The shank axial pilot bore 14 was 0.250 inches in diameter, and the body bore 15 was 1.380 inches in diameter. The wall thickness of the cutter body was 0.100 inches. The body bore 15 at the lower end of the cutter body 11 converged to an inner diameter of 1.350 inches, to provide an inside diameter step back taper which minimizes inside cutting friction in a conventional manner. The cutter body 11 was provided on the lower end thereof, with an outer diameter back taper of 0.005 inches per inch, which is a conventional back taper for cutters of this type. The cutter body 11 has a sidewall 18, the length of which is greater than the thickness of the workpiece in which a hole is to be cut. As shown in FIGS. 3 and 4, the lower or cutting end of the sidewall 18 has formed around the periphery thereof a plurality of circumferentially spaced cutter teeth. As illustrated the cutter teeth are divided into two groups, namely, a first group which are each generally designated by the numeral 20, and a second group which are each generally designated by the numeral 22. The cutter teeth 22 are alternately arranged so that one tooth 20 is disposed circumferentially between successive teeth 22. As seen in FIGS. 1, 3 and 4 the cutter teeth 20 and 22 are circumferentially spaced apart by spiral flutes 23 which extend upwardly from the lower end of the cutter body 11, around the outer periphery of the cutter body 11 and adjacent each tooth 20 and 22. The successive spiral flutes 23 are separated by a land 24 at the outer periphery of the cutter. The leading edge of each land 24 is formed with a narrow margin or relief land 25. The relieve land 25 in the aforesaid one embodiment was disposed 0.015 inches radially outward from the land 24, and was of a peripheral length of 0.045 inches. As best seen in FIG. 4, portions of the annular sidewall 18 of the cutter 10, between successive teeth 20 and 22 comprise webs 26. The radial outer face 27 of each web 26 defines the radial inner wall of each flute 23. As shown in FIG. 1, each of the spiral flutes 23 includes a circumferentially leading sidewall 28 and a circumferentially trailing sidewall 29. The helix angle of each of the helical flutes 23 in said one embodiment was 30 degrees.

Figure 5:
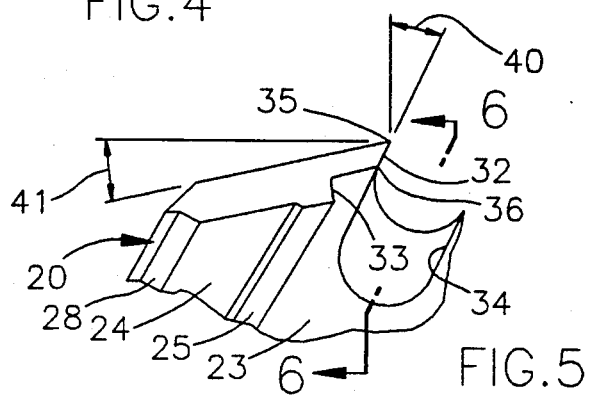
FIG. 5 is an enlarged, fragmentary, side elevation view of the annular hole cutter illustrated in FIG. 4, and taken in the direction of the arrow "5" in FIG. 4.
Figure 6:
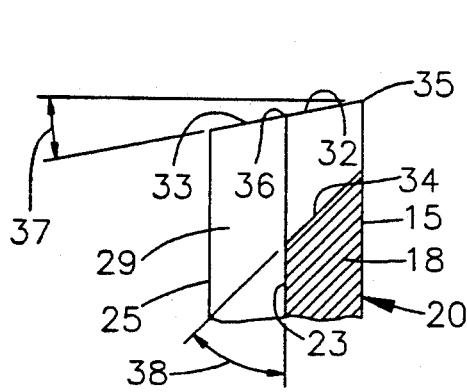
FIG. 6 is a fragmentary, elevation section view of the annular hole cutter illustrated in FIG. 5, taken along the line 6—6 thereof, and looking in the direction of the arrows.

In the cutter illustrated in FIGS. 1 thru 6, each cutter tooth 20, in the first group of cutter teeth, is formed with a radial inner cutting edge 32 and a noncutting outer edge 33. As shown in FIG. 5, the radial inner cutting edge 32 is spaced forwardly, in the direction of rotation, from the noncutting outer edge 33. The radial inner cutting edge 32 is located at the lower end of the trailing face of an inner gullet 34 which is formed in the web 26. As best seen in FIG. 6, the lower end of the trailing face of the gullet 34 inclines radially outwardly and upwardly toward the lower end of the cutter body 11, so as to form the radial inner cutting edge 32, with an inner radial end point 35, which extends downwardly beyond a radial outer end point 36 of the radial inner cutting edge 32. The radial outward inner cutting edge 32 extends for a radial distance equal to the width of the cutter body sidewall 18 and it slopes longitudinally upwardly of the cutter body 11, from the radial inner end point 35. As shown in FIG. 6, each of the cutter teeth 20 is provided with an 11 degree surface angle, designated by the numeral 37, and a 45 degree gullet incline angle designated by the numeral 38. As shown in FIG. 5, each of the cutter teeth 20 is provided with a 28 degree radial gullet angle, designated by the numeral 40, and a 12 degree drop angle, designated by the numeral 41. The incline angle 38 for the gullet 34 is 45 degrees.

Figure 7:
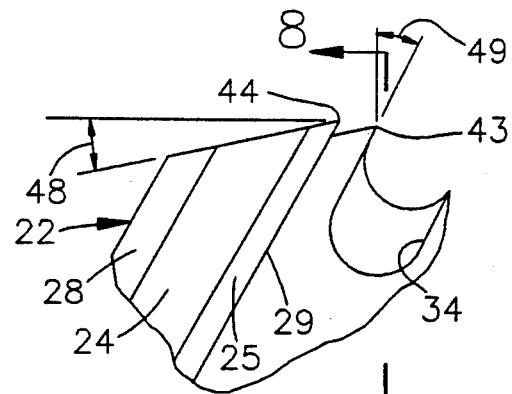
FIG. 7 is an enlarged, fragmentary, side elevation view of the annular hole cutter illustrated in FIG. 4, and taken in the direction of the arrow "7" in FIG. 4.
Figure 8:
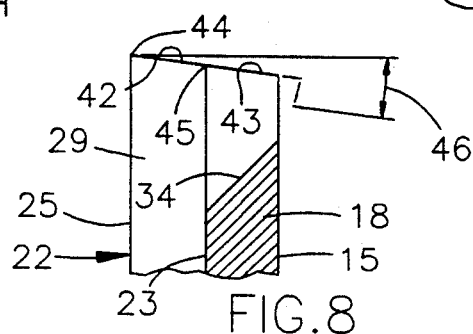
FIG. 8 is a fragmentary, elevation section view of the annular hole cutter illustrated in FIG. 7, taken along the line 8—8 thereof, and looking in the direction of the arrows.

As shown in FIG. 8, each of the cutter teeth 22 is provided with an radial outer cutting edge 42 and an inner radial noncutting edge 43. As shown in FIG. 8, the radial outer cutting edge 42 and the inner radial noncutting edge 43 slope longitudinally upward of the cutter body 11 and radially inward. The radial outer end of the radial outer cutting edge 42 terminates in a point 44 which is longitudinally lower than the inner end point 45 of the radial outer cutting edge 42. Each of the cutter teeth 22 has a 7 degree surface angle, as designated by the numeral 46. As designated by the numeral 48 in FIG. 7, each of the cutter teeth 22 has a 12 degree back-off or drop angle. The numeral 49 in FIG. 7 designates a 28 degree radial gullet angle for each of the cutter teeth 22. The radial outer cutting edge 42 of a cutter tooth 22 is equal in radial width to the radial width of the cutter body sidewall 18, and to the radial width of the radial inner cutting edge 32 of each cutter tooth 20. The radius of the gullet 34 is 0.062 inches.

The radial inner end point 35 of each of the radial inner cutting edges 32, of each of the cutter teeth 20, extends longitudinally downward, beyond the radial outer end point 44 on the radial outer cutting edges 42, of each of the cutter teeth 22. The radial inner end points 35 of the radial inner cutting edges 32 extend longitudinally downwardly 0.010 inches beyond the radial outer end points 44 on the radial outer cutting edges 42 of the cutter teeth 22. It will be understood, from the aforedescribed description of the structure of the cutter teeth 20 and 22, that the cutter 10 of the present invention has a plurality of alternate radial inner cutting edges 32 on the cutter teeth 20, and a plurality of alternate radial outer cutting edges 42 on the cutter teeth 22 which are circumferentially staggered rearwardly from the radial inner cutting edges 32 on the cutter teeth 20 in relation to the direction of rotation. In use, the radial inner end points 35 on the cutter teeth 20 penetrate the surface of a workpiece before the outer radial end points 44 on the cutter teeth 22 contact the surface of a workpiece. Experience has shown that the annular hole cutter 10 can operate efficiently within the range of revolutions per minute provided by a magnetic drill press motor, and that it will penetrate the surface of a workpiece with no tool vibration.

By providing each of the cutter teeth 20 with an 11 degree surface angle, with a 12 degree drop angle intersected with a 28 degree radial gullet angle, a 6 degree rake angle is created. The 6 degree rake angle effectively and efficiently folds the chips cut from a workpiece into the 45 degree incline angle of the gullet 34, which creates an efficient chip removal from a workpiece. After the point 35 on each of the radial inner cutting edges 32 on the cutter teeth 20 has established chip removal action from a workpiece, the points 44 on the radial outer cutting edges 42 of the cutter teeth 22 make contact with the surface of a workpiece. Having the cutter teeth 22 provided with a 7 degree surface angle opposite to the 11 degree surface angle on the cutter teeth 20, with a 12 degree drop angle intersected with a 28 degree radial gullet angle, a 4 degree rake angle is created for each of the cutter teeth 22. The 4 degree rake angle for the cutter teeth 22 pulls the chips removed from a workpiece in an upward direction, forcing them upward through the spiral flutes 23, and to follow the 30 degree helix angle of the spiral flutes 23.

FIGS. 9a thru 9h illustrate the penetration of an annular hole cutter 10, made in accordance with the invention, into a metal workpiece 50, and wherein the cutter 10 is fed into the workpiece 50 at a rate of 0.010 inches per revolution.

The numeral 50 in FIGS. 9a thru 9h generally designates a fragmentary portion of a workpiece having a surface 51 into which is being formed a hole by the annular hole cutter 10.

Figure 9A:
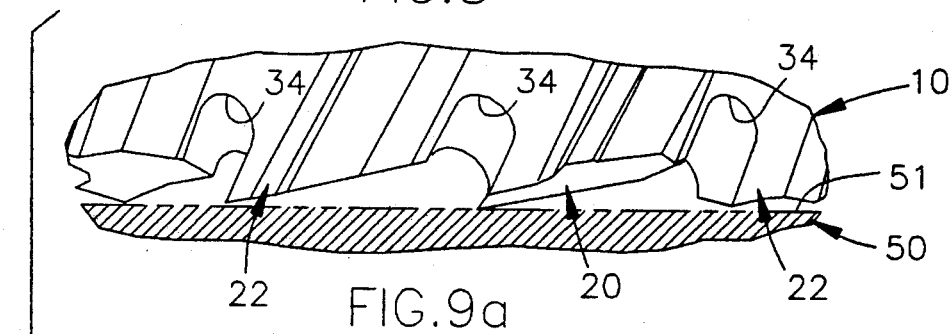
FIGS. 9a thru 9h are fragmentary, elevation perspective views of the lower end of the annular hole cutter illustrated in FIGS. 1 thru 8, and showing the progression of the penetration of the annular hole cutter into a workpiece.

FIG. 9a shows the points 35 on the leading radial inner end of the radial inner cutting edge 32 of a cutter tooth 20 making an initial contact with the surface 51 of the workpiece 50. The radial outer leading end point 44 of the two radial outer cutting edges 42 on two cutter teeth 22 are illustrated as being disposed 0.010 inches above the surface 51 of the workpiece 50.

Figure 9B:
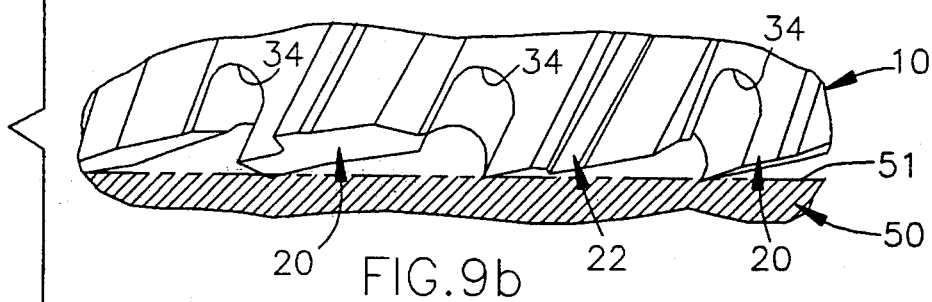

FIG. 9b shows the penetration of the annular hole cutter 10 into the workpiece 50, after one revolution of the cutter feeds the cutter teeth 20 0.010 inches into the workpiece 50. The cutter teeth 20 at this point of penetration would be raising a chip from the workpiece 50.

Figure 9C:
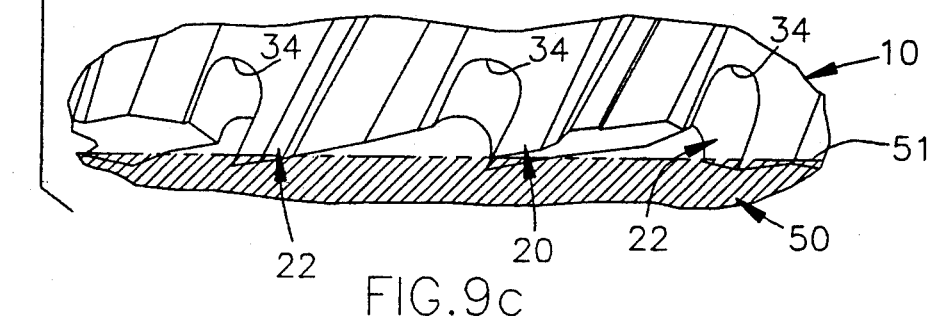

FIG. 9c shows the position of the annular hole cutter 10 after 2 revolutions thereof, and with the cutter teeth 20 penetrating to a depth of 0.020 inches into the workpiece 50, and at which time the chips cut by the cutter teeth 20 would be folded by the radial inner cutting edges 32 of the cutter teeth 20 into the gullets 34. At the same time the radial outer cutting edges 42 of the cutter teeth 22 have penetrated 0.010 inches into the workpiece 50 and are raising a chip from the workpiece 50.

Figure 9D:
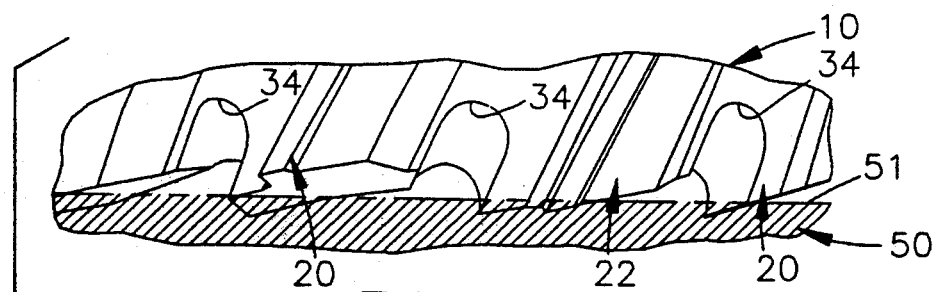

FIG. 9d shows the penetration status of the annular hole cutters 10 after 3 revolutions of the same. At that point in the penetration of the workpiece 50 the radial inner cutting edges 32 of the cutter teeth 20 have penetrated 0.030 inches into the workpiece 50, and the chips cut by each of the radial inner cutting edges 32 follow the 45 degree angle of the gullet 34, while at the same time the radial outer cutting edges 42 of the cutting teeth 22 are at a depth into the workpiece of 0.020 inches and the chips being cut by the radial outer cutting edges 42 flow upwardly through the spiral flutes 23.

Figure 9E:
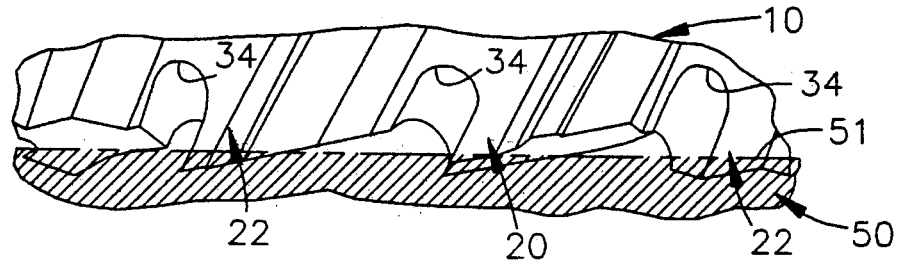

FIG. 9e illustrates the penetration of a cutter 10 after 4 revolutions and wherein the cutter teeth 20 have penetrated 0.040 inches into the workpiece 50. At this point, the chips cut by the cutter teeth 20 are leaving the gullet angle in a spiral motion while the cutter teeth 22 have penetrated 0.030 inches into the workpiece 50 and the chips cut by the cutter teeth 22 follow the helix angle of the flutes 23.

Figure 9F:
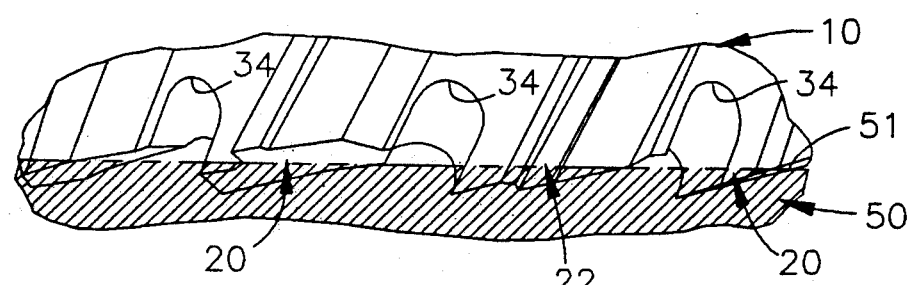

FIG. 9f shows the penetration of the cutter 10 after 5 revolutions thereof, and in which position the cutter teeth 20 are 0.050 inches into the workpiece 50 and have reached full cutting pressure. The chips cut by the cutter teeth 20 are approximately 0.100 inches thick and are shaped in a spiral manner as they are removed from the workpiece 50. The cutter teeth 22 at this time have penetrated 0.040 inches into the workpiece 50 and the chips cut by the cutter teeth 22 are bent over and flow outward through the helix angle of the flutes 23.

Figure 9G:
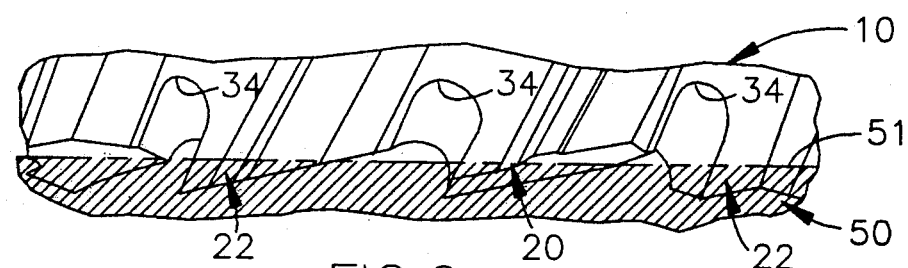

FIG. 9g shows the penetration of the cutter 10 after 6 revolutions thereof, and wherein the cutter teeth 20 are 0.060 inches into the workpiece 50, and the cutter teeth 22 have penetrated 0.050 inches into the workpiece 50 and have reached full cutting pressure.

Figure 9H:
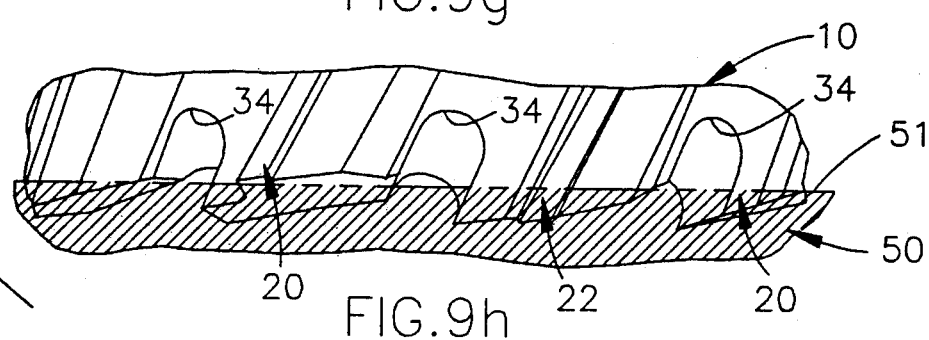

FIG. 9h shows penetration of the cutter 10 into the workpiece 50 wherein the cutter teeth 20 have penetrated 0.070 inches into the workpiece 50, and the cutter teeth 22 have penetrated 0.060 inches into the workpiece 50.

It will be seen that the staggered tooth arrangement of the radial inner cutting edges 32 on the cutter teeth 20 and the radial outer cutting edges 42 on the cutter teeth 22 distributes the share of the cutting burden on both sets of these cutter teeth 20 and 22, allowing the cutter 10 to cut with no vibration and with less required cutter pressure, which results in less heat being generated in the cutter 10 and the workpiece 50, and in more efficient chip removal and efficient cutting operations.

FIGS. 10, 11 and 12 are schematic illustrations of the width of the material removal area made by the cutter teeth 20 and 22 as they penetrate into the surface of a workpiece, as illustrated in FIGS. 9a thru 9h. FIG. 10 illustrates the comparison of the width of a chip being cut by both the radial inner cutting edges 32 on the cutter teeth 20, and the radial outer cutting edges 42 on the cutter teeth 22, after each group of said cutting edges 32 and 42 has penetrated into the workpiece 50 to a depth of 0.020 inches. FIG. 11 shows the width of a chip being cut by both the radial inner cutting edges 32 and the radial outer cutting edges 42 after each group of said cutting edges 32 and 42 has penetrated into the workpiece 50 to a depth of 0.040 inches. FIG. 12 shows the width of a chip being cut by both the radial inner cutting edges 32 and the radial outer cutting edges 42 after each group of said cutting edges 32 and 42 has penetrated into the workpiece 50 to a depth of 0.060 inches. It will be seen that each group of said cutting edges 32 and 42 has penetrated to a depth of 0.060 inches that the radial inner cutting edges 32 and the radial outer cutting edges 42 make equal width cuts in a workpiece, so that each of the cutter teeth 20 and 22 make equal substantially width cuts.

The aforementioned dimensions for the various parts of cutter 10 are typical for an annular hole cutter of the diameter of the size stated. However, it will be understood that the aforementioned dimensions will vary for other sizes of annular hole cutters. For example, the surface or back-off angles 41 and 48 for each of the cutter teeth 20 and 22 may vary in a range of from 5 degrees to 20 degrees. The surface angle 37 for each of the cutter teeth 20 may vary in a range of from 8 degrees to 15 degrees. The surface angle 46 for each of the cutter teeth 22 may vary in a range of from 1 degree to 15 degrees. The radial gullet angle 40 for each of the cutter teeth 20 and the radial gullet angle 49 for each of the cutter teeth 22 may vary in a range of from 16 degrees to 40 degrees. The radius for the gullets 44 may vary in a range of from 0.031 inches to 0.187 inches. The incline angle for the gullets 34 may vary in a range of from 0 to 70 degrees. The helix angle for the flutes 23 may vary in a range of from 21 to 40 degrees.

The leading sidewall 28, for the spiral flutes 23, may preferably be formed at an angle of 45 degrees. The sidewall 18 of the cutter body 11 may vary in a range of from a width of 0.030 inches to 0.350 inches. The thickness dimension from the inner bore 15 of a cutter 10 to the outer surface of the margin relief land 25 of a cutter tooth may vary in the range of from 0.065 inches to 0.375 inches. The margin relief land 25 may extend radially outward from the surface of the land 24 for a dimension which may vary in a range of from 0.0 inches 0.250 inches. The peripheral or circumferential extent of each of the margin relief lands 25 may vary in a range of from 0.0 inches to 0.250 inches. The noncutting edges 33 on the cutter teeth 20, and the radial outer cutting edges 42 on the cutter teeth 22 are disposed at an angle of 90 degrees to the outer periphery of the cutter body 18. The noncutting edge 33 on each cutter tooth 20 is disposed circumferentially rearwardly from the radial outer end 36 of the radial inner cutting edge 32 for a distance of 0.100, inches but this dimension may vary in a range of from 0.0 inches to 0.300 inches. The radial outer cutting edge 42 on each of the cutter teeth 22 is disposed circumferentially rearwardly, from the radial outer end of the noncutting edge 43, a distance of 0.100 inches, but this dimension may also vary in a range of from 0.0 inches to 0.300 inches. Each of the radial inner cutting edges 32 on the cutter teeth 20 is disposed on a longitudinal plane which is disposed 6 degrees circumferentially forward in the direction of cutting rotation of the cutter 10, and wherein said 6 degrees is measured from a radius line which intersects the inner end point 35 of each of the radial inner cutting edges 32, so as to make the point 35 on these cutting edges a leading point in the direction of rotation. The 6 degree leading dimension may vary in a range of from −8 degrees to 18 degrees.

The noncutting edge 43 of each of the cutter teeth 22 is disposed on a longitudinal plane which has the outer end thereof circumferentially advanced in the direction for rotation of the cutter 10 at a distance of an angle of 4 degrees, relative to a radius line which intersects the inner end of the noncutting edge 43 at a angular degree of 4 degrees. This last mentioned angular dimension may vary in a range of from −8 degrees to 12 degrees.

Figure 13D:
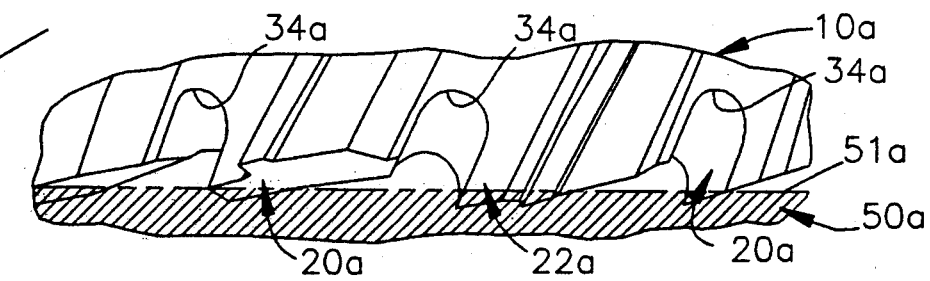
Figure 13E:
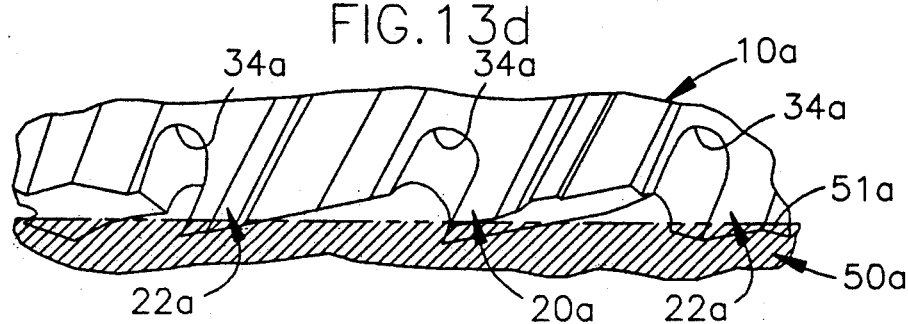
Figure 13F:
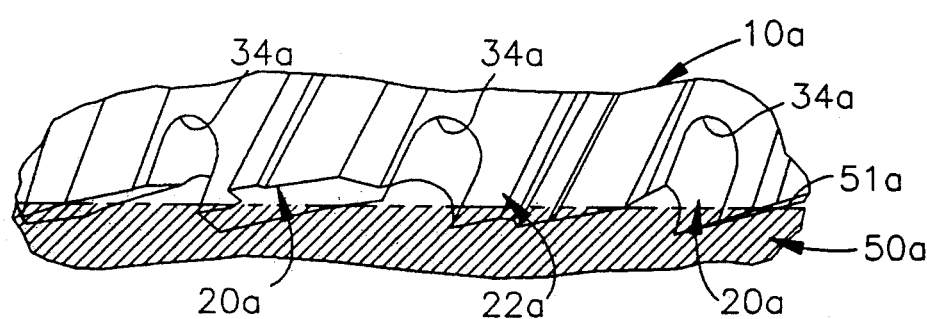
Figure 13G:
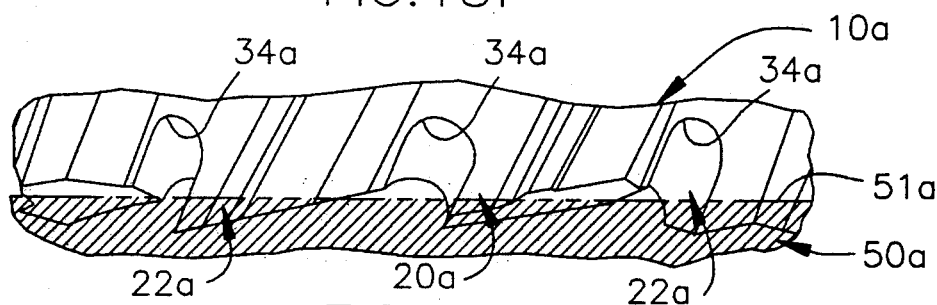
Figure 13H:
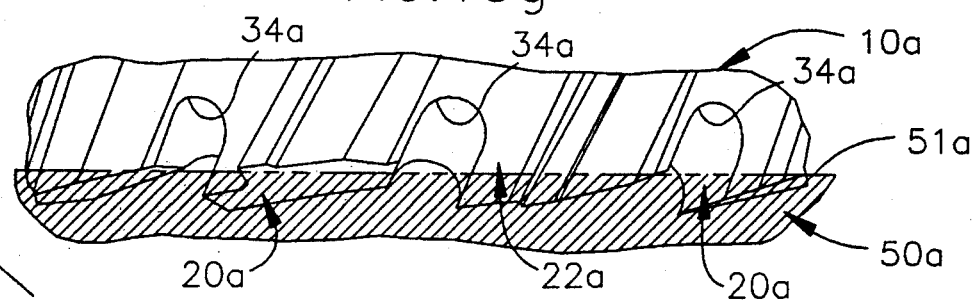

FIGS. 13a thru 13h illustrate a second embodiment of the invention wherein the cutter teeth 22a are extended 0.010 inches longitudinally downwardly below the cutter teeth 20a. The cutter 10a illustrated in FIGS. 13a thru 13h will function in the same manner when making an initial contact with the surface 51a of the workpiece 50a, as described for the operation of the cutter 10 when penetrating a workpiece 50 in the description of FIGS. 9a thru 9h. The chip removal width for the cutter 10a in FIGS. 13a thru 13h would be the same as described for the cutter 10 in FIGS. 9a thru 9h. The only difference between the cutter 10a and the cutter 10 is that the radial outer cutting edges on the cutter teeth 22a cut 0.010 inches ahead of the radial inner cutting edges on the cutter teeth 20a. FIG. 13a shows the cutter 10a engaging a surface 51a of a workpiece 50a with the leading radial outer cutting edges on the cutter teeth 22a. The leading radial inner cutting edges on the cutter teeth 20a are spaced longitudinally upward from the surface of the workpiece 50a by a distance of 0.010 inches. FIGS. 13b thru 13h shows the progressive penetration of the cutter 10a into the workpiece 50a, for 55 successive revolutions of the cutter 10a, in the same manner as described for the cutter 10 for FIGS. 9b thru 9h. FIG. 12b shows the position of the cutter 10a relative to the workpiece 50a after one revolution of the cutter 10a. FIG. 12c shows the position of the cutter 10a relative to the workpiece 50a after two revolutions, and FIGS. 12d, 12e, 12f, 12g and 12h show the position of the cutter 10a relative to the workpiece 50a, after 2, 3, 4, 5, 6 and 7 revolutions of the cutter 10a, respectively.

The cutter 10a provides the same staggered and alternate cutting action, in the same manner as provided by the cutter 10, with the exception that the alternate radial outer cutting edges on the cutter teeth 22a precede the cutting action of the alternate radial inner cutting edges on the cutter teeth 20a.

In the two aforedescribed embodiments the leading points 35 and 44 of the radial inner and radial outer cutting edges 23 and 42, respectively, were stated to be disposed longitudinally downward an optimum distance of 0.010 inches beyond each other in the respective embodiments. However, the distance of extension between the leading points 35 and 44, relative to each other, can vary in a range of from 0.002 inches to 0.045 inches.

What is claimed is:

1. An annular hole cutter (10) for cutting a hole in a workpiece, including a cylindrical body (11) having a generally cylindrical sidewall (18), said body (11) having a shank (12) on an upper end thereof, and an axial bore (15) extending upwardly therein from a lower end thereof, characterized in that:
   (a) said cylindrical body (11) is provided around the lower end thereof with a plurality of circumferentially spaced apart cutter teeth;
   (b) said cutter teeth including a first group of cutter teeth (20) that have alternate radial inner cutting edges (32), and a second group of cutter teeth (22) that have alternate radial outer cutting edges (42);
   (c) a plurality of helical flutes (23) extending upwardly around the cylindrical sidewall (18) from the lower end of the body (11);
   (d) each of said cutter teeth (20,22) being connected with an adjacent cutter tooth by a circumferentially extending web (26) adjacent the inner periphery of said cylindrical sidewall (18), and said webs (26) being disposed side by side radially with said helical flutes (23);
   (e) each of said helical flutes (23) having circumferentially spaced leading (28) and trailing (29) sidewalls and a circumferentially extending radial inner wall which defines a radial outer face of a web;
   (f) gullet means on each web extending upwardly from each of said radial inner cutting edges (32) and opening radially outward into an adjacent helical flute;
   (g) each of the alternate radial outer cutting edges (42) being defined by a lower end of a trailing sidewall (29) of an adjacent helical flute (23);
   (h) the radial outer cutting edges (42) of said second group of cutter teeth (22) being staggered circumferentially rearwardly in the relation to the direction of rotation of the annular hole cutter (10) from the alternate radial inner cutting edges (32) of said first group of cutter teeth (20);
   (i) each of the cutter teeth (20,22) in said first and second group of cutter teeth having a circumferential back-off face, with a drop angle to relieve said cutter teeth upwardly;
   (j) each of the cutter teeth (20) in said first group of cutter teeth having a radial back-off face that is disposed at a surface angle which is inclined upwardly and radially outward;
   (k) the cutter teeth in said second group of cutter (22) teeth having a radial back-off face that is disposed at a surface angle which is inclined upwardly and radially inward;
   (l) said radial back-off face surface angle of said first group of cutter teeth being of a larger degree than the radial back-off face surface angle of said second group of cutter teeth; and, (m) each of the cutting edges (32,42) on each of the two groups of cutter teeth (20,22) being formed with a leading point (35,44), and the leading points (35,44) on the cutting edges (32,42) of the cutter teeth (20,22) in one of the groups of cutter teeth extending longitudinally downward beyond the leading points (35,44) on the cutting edges (32,42) of the cutter teeth (20,22) of the other group of cutter teeth so to engage a workpiece in a cutting action before the leading points (35,44) on the other group of cutter teeth engages a workpiece.

2. An annular hole cutter (10) as defined in claim 1, wherein:
(a) the alternate radial inner cutting edges (32) of the first group of cutter teeth (20) and the alternate radial outer cutting edges (42) of the second group of cutter teeth (22) share the chip removal width of a cut into a workpiece.

3. An annular hole cutter (10) as defined in claim 1, wherein:
(a) the leading points (35) on the alternate radial inner cutting edges (32) of the first group of cutter teeth (20) extend longitudinally downward beyond the leading points (44) on the alternate radial outer cutting edges (42) for a distance selected from a range of from 0.002 inches to 0.045 inches.

4. An annular hole cutter (10) as defined in claim 1, wherein:
(a) the leading points (44) on the alternate radial outer cutting edges (42) of the second group of cutter teeth (22) extend longitudinally downward beyond the leading points (35) on the alternate radial inner cutting edges (32) for a distance selected from a range of from 0.002 inches to 0.045 inches.

5. An annular hole cutter (10) as defined in claim 1, wherein:
(a) the circumferential back-off face surface drop angle to relieve said cutter teeth (20,22) upwardly in said first and second groups of cutter teeth is selected from a range of from 5 degrees to 20 degrees.

6. An annular hole cutter (10) as defined in claim 1, wherein:
(a) the radial back-off face surface angle for said cutter teeth (20) in said first group of cutter teeth is selected from a range of from 8 degrees to 15 degrees.

7. An annular hole cutter (10) as defined in claim 1, wherein:
(a) the radial back-off face surface angle for said cutter teeth (22) in said second group of cutter teeth is selected from a range of from 4 degrees to 10 degrees.

8. An annular hole cutter (10) as defined in claim 1, wherein:
(a) the helix angle for each of said helical flutes (23) is selected from a range of from 21 degrees to 40 degrees.

9. An annular hole cutter (10) as defined in claim 1, wherein:
(a) the gullet means has an incline angle selected from a range of from zero degrees to 70 degrees.

* * * * *

UNITED STATES PATENT OFFICE
CERTIFICATE OF CORRECTION

Patent No. 5,281,060                 Dated   January 25, 1994

Inventor(s)   Robert E. Strange, et al

It is certified that error appears in the above-identified patent and that said Letters Patent is hereby corrected as shown below:

Column 8, line 5, "23" should be --32--.

Signed and Sealed this

Seventeenth Day of May, 1994

Attest:

BRUCE LEHMAN

Attesting Officer       Commissioner of Patents and Trademarks